US00RE44451E

(19) United States
(12) Reissued Patent
Hasemann

(10) Patent Number: US RE44,451 E
(45) Date of Reissued Patent: Aug. 20, 2013

(54) METHOD AND SYSTEM FOR TRANSMITTING INFORMATIONAL CONTENT DATA

(75) Inventor: Joerg-Michael Hasemann, Emtinhausen (DE)

(73) Assignee: IPCom GmbH & Co. KG (DE)

(21) Appl. No.: 12/756,814

(22) Filed: Apr. 8, 2010

Related U.S. Patent Documents

Reissue of:
(64) Patent No.: 7,356,593
Issued: Apr. 8, 2008
Appl. No.: 10/070,652
PCT Filed: Aug. 25, 2000
PCT No.: PCT/DE00/02915
§ 371 (c)(1),
(2), (4) Date: Jul. 17, 2002
PCT Pub. No.: WO01/19020
PCT Pub. Date: Mar. 15, 2001

(30) Foreign Application Priority Data

Sep. 9, 1999 (DE) ..... 199 43 058

(51) Int. Cl.
*G06F 15/173* (2006.01)

(52) U.S. Cl.
USPC ..... 709/226; 709/203; 709/206; 709/217; 709/218; 709/219

(58) Field of Classification Search
USPC ..... 709/203, 206, 217, 218, 219, 226; 713/168
See application file for complete search history.

(56) References Cited

U.S. PATENT DOCUMENTS

| | | | | |
|---|---|---|---|---|
| 3,914,692 | A | 10/1975 | Seaborn | |
| 5,787,089 | A | 7/1998 | Casey et al. | |
| 5,852,721 | A | 12/1998 | Dillon et al. | |
| 5,987,325 | A | 11/1999 | Tayloe | |
| 6,256,498 | B1 | 7/2001 | Ludwig | |
| 6,292,742 | B1 | 9/2001 | Heimann et al. | |
| 6,546,488 | B2 | 4/2003 | Dillon et al. | |
| 7,356,593 | B1 * | 4/2008 | Hasemann | 709/226 |
| 2002/0059526 | A1 * | 5/2002 | Dillon et al. | 713/201 |

FOREIGN PATENT DOCUMENTS

| | | |
|---|---|---|
| DE | 3918668 | 12/1990 |
| DE | 4105584 | 2/1992 |
| DE | 19518205 | 9/1996 |
| DE | 19621424 | 12/1997 |
| DE | 19753050 | 8/1998 |

(Continued)

OTHER PUBLICATIONS

"Digital Cellular Telecommunications System (Phase 2+)", General Packet Radio Service (GSM 04.65 version 6.1.0 Release 1997); TS101297 V6.1.0 Jul. 1998.

(Continued)

*Primary Examiner* — Yves Dalencourt
(74) *Attorney, Agent, or Firm* — Kilpatrick Townsend & Stockton LLP

(57) ABSTRACT

A method and a system for transmitting informational content data to a plurality of terminals is provided, in which informational content data and informational description data are provided in a memory of at least one information provider station the informational content data and the informational description data are loaded into a memory of a central informational transmission station, an informational content data block is generated based on the loaded informational content data and an informational description data block based on the loaded informational description data in the central information transmission station, the informational content data block and the informational data description block are linked to a data transmission block, and the data transmission block is transmitted from the central information transmission station to a plurality of terminals.

38 Claims, 2 Drawing Sheets

(56) References Cited

FOREIGN PATENT DOCUMENTS

| | | |
|---|---|---|
| DE | 19730363 | 1/1999 |
| DE | 19733507 | 3/1999 |
| EP | 0261010 | 9/1988 |
| EP | 0281010 | 9/1988 |
| EP | 0748135 | 12/1996 |
| EP | 0849923 | 6/1998 |
| EP | 0 891 062 | 1/1999 |
| EP | 891 424 | 4/2003 |
| EP | 0891062 | 4/2003 |
| WO | WO-9916226 | 4/1999 |
| WO | WO-9916277 | 4/1999 |

OTHER PUBLICATIONS

"ETSI EN 300 943 V7.0.0—Digital Cellular Telecommunications System", Short Message Service Cell Broadcast (GSM 04.12 version 7.0.0 Release 1998) Aug. 1999.

Global System for Mobile Communications, "Digital Cellular Telecommunications System", GSM 03.41 version 7.1.0 Release 1998—ETSI TS 100 902 V7.1.0 Jul. 1999.

"Global System for Mobile Communications, European Digital Cellular Telecommunications System", (Phase 2); GSM 02.03—ETS 300 502 Sep. 1994.

Bossert, Martin "Kanaloodierung", B.G. Teubner Stuttgart 1998 , 7-13.

Rappaport, Theodore "Wireless Communications, Principles and Practice", Prentice Hall PTR, Upper Saddle River, New Jersey 07458 1996 , 338-357; 513-519.

Global System for Mobile Communications, "Digital Cellular Telecommunications System (Phase 2+), Technical Realization of Cell Broadcast Service (CBS)" (GSM 03.41 Version 7.1.0 Release 1998), 32 pages, TS 100 902 v7.1.0 (Jul. 1999), ETSI.

Global System for Mobile Communications, "European digital cellular telecommunications system (Phase 2); Teleservices supported by a GSM Public Land Mobile Network (PLMN)"(GSM 02.03), Sep. 1994, 21 pages, ETSI.

TS 101 297 V6.1.0 (Jul. 1998) Technical Specification, pp. 1-35, Digital Cellular Telecommunication System (Phase 2+); General Packet Radio Service (GPRS); Mobile Station (MS)—Serving GPRS Support Node (SGSN); Subnetwork Dependent Convergence Protocol (SNDCP) (GSM 04.65 version 6.1.0 Release 1997); Global System Mobile Communications.

ETSI EN 300 943 v7.0.0 (199-08) European Standard (Telecommunications series), pp. 1-14, Digital Cellular Telecommunications Systems (Phase 2+); Short Message Service Cell Broadcast (SMSCB) support on the mobile radio interface (GSM 04.12 version 7.0.0 Release 1996); Global System Mobile Communications.

Theodore S. Rappaport, "Wireless Communications, Principles and Practice", 1996, pp. 338-519 (16 pages), Prentice Hall PTR, Upper Saddle River, NJ 07458.

Martin Bossert, "Kanaloodierung", 1998, pp. 7-13 (6 pages), B. G. Teubner Stuttgart (English language copy of Informationstechnik—Tech. Information).

* cited by examiner

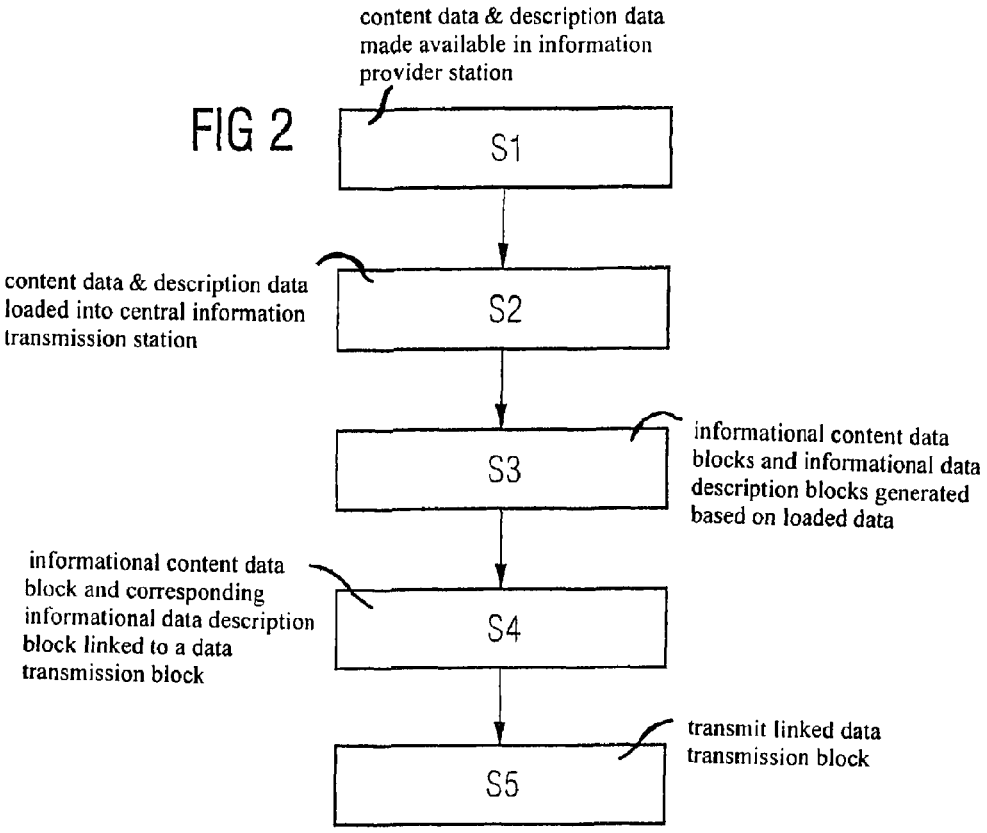
FIG 2
content data & description data made available in information provider station
S1
content data & description data loaded into central information transmission station
S2
S3
informational content data blocks and informational data description blocks generated based on loaded data
informational content data block and corresponding informational data description block linked to a data transmission block
S4
transmit linked data transmission block
S5

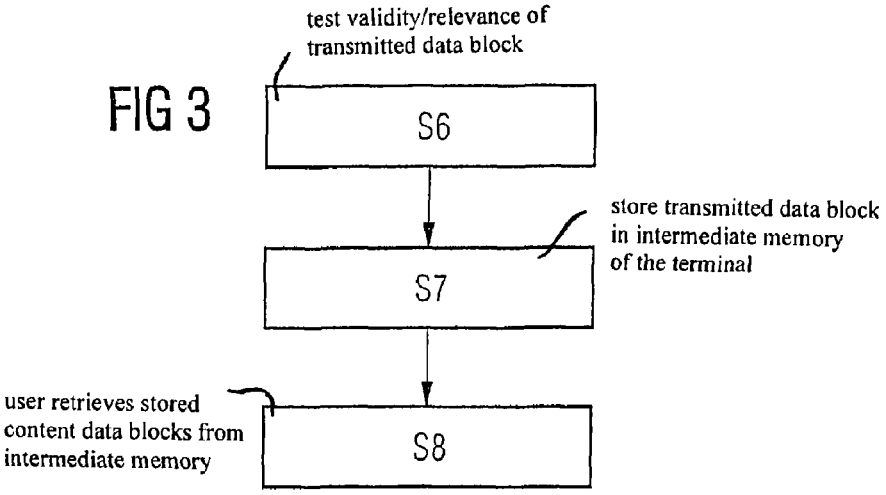
FIG 3
test validity/relevance of transmitted data block
S6
store transmitted data block in intermediate memory of the terminal
S7
user retrieves stored content data blocks from intermediate memory
S8

METHOD AND SYSTEM FOR TRANSMITTING INFORMATIONAL CONTENT DATA

Matter enclosed in heavy brackets [ ] appears in the original patent but forms no part of this reissue specification; matter printed in italics indicates the additions made by reissue.

*CROSS-REFERENCE TO RELATED APPLICATIONS*

*More than one reissue application has been filed. On Jul. 23, 2012 a continuation reissue application was filed and assigned U.S. Ser. No. 13/555,956.*

FIELD OF THE INVENTION

The present invention relates to a method and a system for transmitting informational content data to a plurality of terminals.

BACKGROUND INFORMATION

It is believed that information is increasingly provided in a multimedia manner in the form of text, image, speech, music, video, etc. by information providers. With the aid of the page description language HTML, information prepared in a multimedia manner may be provided on the world-wide Internet (WWW world wide web) as linked multimedia documents. The individual pages or documents of the provider are typically transmitted point to point, i.e., from the information provider directly to the terminal. To obtain information interesting to him/her, the user of a terminal, e.g., of a computer or a mobile telephone, may establish the connection to the information provider and request the desired information. If, for example, a user residing in the region of Munich would like to receive traffic reports about the Munich area, he/she must request this information from the information provider by establishing a connection to the information provider by a telecommunications network. After establishing a transmission channel to the information provider and the terminal of the user, the desired information is then transmitted to the terminal, e.g., a mobile telephone, as informational content data.

It may be difficult and time-consuming for the user of the terminal to establish the connection to the information provider. Moreover, the connection is established and the informational content data is transmitted at the request of the user of the terminal, often at times when it may be costly to transmit informational content data.

It is believed that a further disadvantage is that the user of the terminal may not be interested in all of the information provided by the information provider, but only in information relevant to him/her. To obtain the information relevant to him/her, the user of the terminal may select the information provided by the information provider. This selection or choice may also be complicated and time-consuming for the user of the terminal.

SUMMARY OF THE INVENTION

It is believed that an exemplary method and exemplary system according to the present invention for transmitting informational content data have the advantage that the user of the terminal receives the information relevant to him/her in a simple and convenient manner.

Furthermore, the information relevant to the user of the terminal may be transmitted to him/her in a cost-effective manner.

Relevant information may be automatically provided to the user of the terminal by a central information transmission stations without the user of the terminal having to request the information from the information provider.

According to an exemplary embodiment of the present invention, the transmitted informational data block is tested in the terminal by an informational data description block for its relevance for the terminal.

In another exemplary embodiment according to the present invention, the relevant informational data transmission block is stored in an intermediate memory of the terminal and may be retrieved for the user.

According to yet another exemplary embodiment of the present invention, the informational data description block receives informational data values regarding the geographic region of validity, the valid time interval, the data format, the coding type, as well as the [manner] *content*[1] and type of transmitted informational content data.

[1]*Translated from the German "Art". The translation to "manner" is not conceded to be the proper translation.*

It is believed that this provides the advantage that the informational data blocks transmitted to the user of the terminal may be filtered according to different criteria.

In another exemplary embodiment according to the present invention, the informational content data and the informational description data from the information providers are loaded by the central transmission station as a function of a request signal transmitted from the central transmission station to the information provider.

According to yet another exemplary embodiment of the present invention, the informational content data and the informational description data from the information provider are automatically loaded by the central transmission station at regular, adjustable intervals.

In still another exemplary embodiment according to the present invention, the informational data blocks are automatically transmitted from the information transmission station to the plurality of terminals at regular, adjustable intervals.

According to yet another exemplary embodiment of the present invention, the informational data blocks are simultaneously transmitted from the information transmission station to a plurality of terminals by a distributor network.

Another exemplary embodiment according to the present invention provides for the informational data blocks to be transmitted from the information transmission station to the terminals in an encrypted manner.

It is believed that this has the advantage that third parties may access the transmitted content data in a desired manner.

According to yet another exemplary embodiment of the present invention, the informational data description blocks transmitted from the transmission station to the terminals include encryption description data indicating the type of encryption of the transmitted informational data blocks.

It is believed that this has the advantage that the user of the terminal is able to request the corresponding decryption program from the information provider.

According to still another exemplary embodiment of the present invention, the decryption data for decrypting the informational data blocks is transmitted by the information provider in response to a request at the provider's terminal.

According to yet another exemplary embodiment of the present invention, the informational content data and the informational description data from the information provider are loaded by the central information transmission station by a first transmission network, and the informational data blocks are transmitted by the central information transmission station to the terminals by a second transmission network.

According to still another exemplary embodiment of the present invention, the informational data blocks are transmitted by a radio communications network to a plurality of mobile terminals.

It is believed that this provides the advantage that the terminals need not be permanently networked in an expensive manner to the central information transmission station.

BRIEF DESCRIPTION OF THE DRAWINGS

FIG. 2 is a flow chart of an exemplary method according to the present invention for transmitting informational content data to a plurality of terminals.

FIG. 3 is a flow chart of a terminal's receiving operation of the transmitted data in accordance with an exemplary embodiment of the present invention.

DETAILED DESCRIPTION

Figure 1:
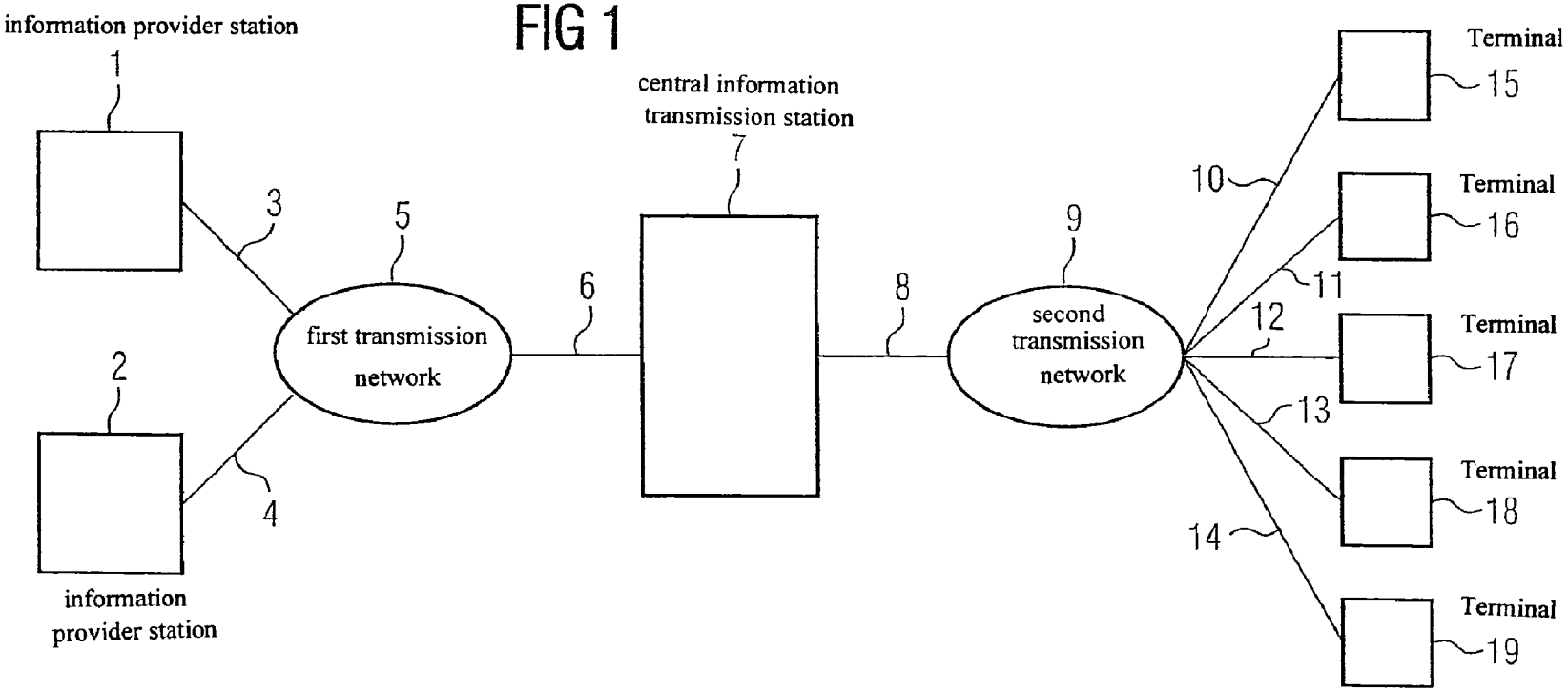
FIG. 1 is a schematic representation explaining the transmission system of the invention for transmitting informational content data to a plurality of terminals.

FIG. 1 shows a schematic representation of the information transmission system of the invention for transmitting informational content data from information providers to terminals by a central information transmission station.

Two information provider stations 1, 2 are shown in FIG. 1. The information provider stations are connected by connection leads 3, 4 to a first transmission network 5. A central information transmission station 7 is connected by a connection lead 6 to first transmission network 5. Central information transmission station 7 is connected by a connection lead 8 to a second transmission network 9. A plurality of terminals 15, 16, 17, 18, 19 are connected by leads 10, 11, 12, 13, 14 to second transmission network 9.

Both transmission networks 5, 9 may be any transmission network for transmitting data, second transmission network 9 may be, for example, a radio communications network for transmitting data to mobile terminals 15-19.

In an exemplary embodiment according to the present invention, the first transmission network is a fixed network, such as, for example, the Internet.

Information for the user of terminals 15-19 is stored in information provider stations 1, 2 in internal storage devices or databases. The first information provider may be a provider of informational traffic data, for example. The second information provider may provide nationwide train schedules, for example. The number of information providers and, thus, the number of information provider stations connected to first transmission network 5 may be as high as desired. The informational data stored in the storage devices of the information provider are loaded by central information transmission station 7 into an internal memory of the information transmission station. The information may be loaded into the internal memory of central information transmission station 7 as a function of a request signal transmitted over transmission network 5 or at regular intervals by information provider stations 1, 2. Second transmission network 9 may permit the simultaneous transmission of information to a plurality of terminals 15-19, for example, by broadcast channels. In another exemplary embodiment according to the present invention, second transmission network 9 is a cellular network. In this exemplary embodiment, terminals 15-19 may be mobile radio communication stations or mobile telephones.

FIG. 2 is a flow chart of an exemplary method according to the present invention for transmitting informational content data to a plurality of terminals 15-19.

In a step S1, informational content data and informational description data are made available in a memory of at least one information provider station 1, 2.

In a step S2, the informational content data, e.g. the informational traffic data or the schedule data, as well as the informational description data are loaded into a memory of central information transmission station 7. The informational description data is provided by the information providers and indicates which information is involved.

For example, the informational description data may indicate that the information pertains to schedule data for the German Federal Railway's summer or winter schedule.

In a step S3, informational data blocks based on the loaded informational content data and informational data description blocks based on the loaded informational description data are generated by a calculation device of central information transmission station 7.

In a step S4, the particular informational content data block and the corresponding informational data description block are linked together to a data transmission block by the calculation device of central information transmission station 7.

In a step S5, information transmission station 7 transmits the linked data transmission block by second transmission network 9 to the plurality of terminals 15-19.

In an exemplary method according to the present invention, the informational content data and the informational description data are loaded by central information transmission station 7 in step S2 as a function of a request signal transmitted by central transmission station 7 by first transmission network 5 to information provider station 2. Alternatively, information provider stations 1, 2 load the informational content data and the informational description data automatically and at regular, settable intervals in step S2.

The data transmission block transmitted in step S5 by central information transmission station 7 to devices 15-19 includes an informational data description block. This informational data description block may have a plurality of informational data records indicating the geographic region of validity, the temporal validity or the valid time period, the data format, the manner in which the data is encoded, and the [type] *content*[2] of *the* transmitted informational content data. The transmitted geographic region of validity indicates in which geographic region the transmitted information is valid or relevant. In another exemplary embodiment according to the present invention, the data record indicating the geographic region of validity has a hierarchical structure, i.e., the transmitted informational content data is declared valid, e.g., on a nation-wide, city-wide, or cell-wide basis. The geographic regions of validity indicated in the informational data records may also overlap. Several geographic regions of validity may be indicated for the transmitted informational content data.

[2] *Translated from the German "Art". The translation to "type" is not conceded to be the proper translation.*

The informational data description block indicates the [type] *content*[3] of *the* transmitted informational content data, i.e., whether it is a traffic announcement, city information, etc., and the type of transmitted informational content data, i.e., whether it is text data, video data, voice data, or audio data.

[3]*See FN 2.*

FIG. 3 is a flow chart depicting the reception of transmitted data blocks by terminals 15-19.

In a step S6, the relevance or the validity of the transmitted informational data block or content data block is tested by the particular terminal 15-19 using the transmitted informational data description block. For example, terminal 15-19 checks whether the transmitted information is valid with respect to time. If the terminal detects that the transmitted data block is valid, it is stored in an intermediate memory of the terminal in a step S7.

In a step S8, the user of the terminal retrieves the informational content data blocks stored in the intermediate memory to use them. In [an] another exemplary embodiment according to the present invention, the transmitted data blocks trigger events or processes in terminals 15-19. For example, content data or documents may be shown on a display of terminal 15-19 daily at a certain time without the user of the terminal having to retrieve the transmitted informational content data block. The user of the terminal may set the time as well as the [type] *content*[4] of the document to be displayed by a keyboard of terminal 15-19.

[4]*See FN 2.*

Data blocks stored temporarily may be automatically deleted from the intermediate memories of terminals 15-19 when they lose their temporal or local validity. If terminal 15-19 is a mobile telephone, for example, and is moving from a first network cell to a second network cell, those informational content data blocks that are only relevant for the first network cell may be deleted.

The data blocks transmitted by central transmission station 7 by second transmission network 9 to terminals 15-19 may be transmitted in an encrypted manner. In this context, the transmitted informational data description block includes encryption description data informing the user of the terminal of the type of encryption of the transmitted data blocks. The user of the terminal may receive a decryption program for decrypting the data blocks transmitted over transmission network 9 from the appropriate information provider by a third transmission network.

If terminals 15-19 are mobile telephones, the decryption data of the decryption programs may be transmitted to terminal 15-19 by information provider stations 1, 2, such as, for example, as SMS messages in a device-dependent manner, i.e., as a function of the SIM card ID. The decryption data may be renewed at regular intervals.

With regard to the encryption, the user of the terminal may send his/her SIM card to the licensing service provider. The user may receive a key from the service provider. This key together with the SIM card to which the decryption program in the terminal has direct access permits the decoding or decryption of the data provided by the service provider.

In another exemplary embodiment according to the present invention, central transmission station 7 constantly receives information regarding the current time as well as the regions in which mobile terminals 15-19 are currently located.

In still another exemplary embodiment according to the present invention, events linked to specific transmitted data blocks are processed by so-called plug-ins. It is believed that plug-ins have the advantage that they may be precisely adjusted to the needs of the user of the terminal, thereby saving memory space and loading time.

An exemplary method and an exemplary system for transmitting informational content data according to the present invention may have many different uses. Examples of applications are providing local information, e.g., city guides, maps, hotel guides, restaurant guides, traffic information, calendar of events, sightseeing tours, bus and train schedules, movie schedules, etc.

Events may be initiated or triggered in the terminals by the transmitted data blocks. This results in additional possible uses, e.g. news, stock market ticker with current information, pop-up messages for the end of summer sale, storm warnings, reports of traffic jams on the highway, bypass recommendations, etc. The information may be displayed to the user in terminals 15-19 or communicated acoustically.

Central information transmission station 7 may be connected to a plurality of different information providers by different transmission networks. An Internet connection results in further possible uses, e.g., references in the city guide to the web sites of different restaurants or references to taxi web sites with ordering capabilities or references to pizza delivery services. If an event is linked to the data block transmitted by transmission network 9 to terminal 15-19, an applications such as, for example, an Internet browsers may be activated in terminal 15-19. The browser may then access the informational content data stored in the intermediate memory of terminal 15-19.

What is claimed is:

1. A method for transmitting informational content data to a plurality of terminals, the method comprising:

providing the informational content data and informational description data in a memory of at least one information provider station;

loading the informational content data and the informational description data into a memory of a central information transmission station;

generating an informational content data block based on loaded informational content data and an informational data description block based on loaded informational description data in the central information transmission station;

linking the informational content data block and the informational data description block to a data transmission block; and transmitting the data transmission block from the central information transmission station to the plurality of terminals, wherein the informational data description block includes informational data records regarding a geographic region of validity, a valid time period, a data format, a manner of at least one of a coding and an encryption, and a manner and type of a transmitted data transmission block.

2. The method of claim 1, further comprising:

checking the data transmission block in at least one of the plurality of terminals by using the informational data description block to determine a relevance of the data transmission block for the at least one of the plurality of terminals.

3. The method of claim 2, further comprising:

storing the data transmission block in an intermediate memory of the at least one of the plurality of terminals if the data transmission block is determined to be relevant, a stored data transmission block being retrievable by a user of the at least one of the plurality of terminals.

4. The method of claim 1, wherein the data transmission block is simultaneously transmittable by the information transmission station to the plurality of terminals by a distributor network.

5. The method of claim 1 wherein the informational content data and the informational description data are loadable by the central information transmission station by a first transmission network, and the data transmission block is transmittable to the plurality of terminals by a second transmission network.

6. A method for transmitting informational content data to a plurality of terminals, the method comprising:

providing the informational content data and informational description data in a memory of at least one information provider station;

loading the informational content data and the informational description data into a memory of a central information transmission station;

generating an informational content data block based on loaded informational content data and an informational data description block based on loaded informational description data in the central information transmission station;

linking the informational content data block and the informational data description block to a data transmission block; and transmitting the data transmission block from the central information transmission station to the plurality of terminals, wherein the informational content data and the informational description data are loaded as a function of a request signal transmitted by the central transmission station to the at least one information provider station.

7. The method of claim 6, further comprising:

checking the data transmission block in at least one of the plurality of terminals by using the informational data description block to determine a relevance of the data transmission block for the at least one of the plurality of terminals.

8. The method of claim 7, further comprising:

storing the data transmission block in an intermediate memory of the at least one of the plurality of terminals if the data transmission block is determined to be relevant, a stored data transmission block being retrievable by a user of the at least one of the plurality of terminals.

9. The method of claim 6, wherein the data transmission block is simultaneously transmittable by the information transmission station to the plurality of terminals by a distributor network.

10. The method of claim 6, wherein the informational content data and the informational description data are loadable by the central information transmission station by a first transmission network, and the data transmission block is transmittable to the plurality of terminals by a second transmission network.

11. A method for transmitting informational content data to a plurality of terminals, the method comprising:

providing the informational content data and informational description data in a memory of at least one information provider station;

loading the informational content data and the informational description data into a memory of a central information transmission station;

generating an informational content data block based on loaded informational content data and an informational data description block based on loaded informational description data in the central information transmission station;

linking the informational content data block and the informational data description block to a data transmission block; and transmitting the data transmission block from the central information transmission station to the plurality of terminals, wherein the informational content data and the information description data are automatically loaded at regular, settable intervals.

12. The method of claim 11, further comprising:

checking the data transmission block in at least one of the plurality of terminals by using the informational data description block to determine a relevance of the data transmission block for the at least one of the plurality of terminals.

13. The method of claim 12, further comprising:

storing the data transmission block in an intermediate memory of the at least one of the plurality of terminals if the data transmission block is determined to be relevant, a stored data transmission block being retrievable by a user of the at least one of the plurality of terminals.

14. The method of claim 11, wherein the data transmission block is simultaneously transmittable by the information transmission station to the plurality of terminals by a distributor network.

15. The method of claim 11, wherein the informational content data and the informational description data are loadable by the central information transmission station by a first transmission network, and the data transmission block is transmittable to the plurality of terminals by a second transmission network.

16. A method for transmitting informational content data to a plurality of terminals, the method comprising:

providing the informational content data and informational description data in a memory of at least one information provider station;

loading the informational content data and the informational description data into a memory of a central information transmission station;

generating an informational content data block based on loaded informational content data and an informational data description block based on loaded informational description data in the central information transmission station;

linking the informational content data block and the informational data description block to a data transmission block; and transmitting the data transmission block from the central information transmission station to the plurality of terminals, wherein the data transmission block is automatically transmittable by the information transmission station to the plurality of terminals at regular, settable intervals.

17. The method of claim 16, further comprising:

checking the data transmission block in at least one of the plurality of terminals by using the informational data description block to determine a relevance of the data transmission block for the at least one of the plurality of terminals.

18. The method of claim 17, further comprising:

storing the data transmission block in an intermediate memory of the at least one of the plurality of terminals if the data transmission block is determined to be relevant, a stored data transmission block being retrievable by a user of the at least one of the plurality of terminals.

19. The method of claim 16, wherein the data transmission block is simultaneously transmittable by the information transmission station to the plurality of terminals by a distributor network.

20. The method of claim 16, wherein the informational content data and the informational description data are loadable by the central information transmission station by a first transmission network, and the data transmission block is transmittable to the plurality of terminals by a second transmission network.

21. A method for transmitting informational content data to a plurality of terminals, the method comprising:

providing the informational content data and informational description data in a memory of at least one information provider station;

loading the informational content data and the informational description data into a memory of a central information transmission station;

generating an informational content data block based on loaded informational content data and an informational data description block based on loaded informational description data in the central information transmission station;

linking the informational content data block and the informational data description block to a data transmission block; and transmitting the data transmission block from the central information transmission station to the plurality of terminals, wherein the informational data description block includes decryption and description data indicating a manner of encrypting the data transmission block.

22. The method of claim 21, further comprising:

checking the data transmission block in at least one of the plurality of terminals by using the informational data description block to determine a relevance of the data transmission block for the at least one of the plurality of terminals.

23. The method of claim 22, further comprising:

storing the data transmission block in an intermediate memory of the at least one of the plurality of terminals if the data transmission block is determined to be relevant, a stored data transmission block being retrievable by a user of the at least one of the plurality of terminals.

24. The method of claim 21, wherein the data transmission block is simultaneously transmittable by the information transmission station to the plurality of terminals by a distributor network.

25. The method of claim 21, wherein the informational content data and the informational description data are loadable by the central information transmission station by a first transmission network, and the data transmission block is transmittable to the plurality of terminals by a second transmission network.

26. A method for transmitting informational content data to a plurality of terminals, the method comprising:

providing the informational content data and informational description data in a memory of at least one information provider station;

loading the informational content data and the informational description data into a memory of a central information transmission station;

generating an informational content data block based on loaded informational content data and an informational data description block based on loaded informational description data in the central information transmission station;

linking the informational content data block and the informational data description block to a data transmission block; and transmitting the data transmission block from the central information transmission station to the plurality of terminals, wherein encryption data for encrypting the data transmission block is transmittable by the at least one information provider station to the plurality of terminals.

27. The method of claim 26, further comprising:

checking the data transmission block in at least one of the plurality of terminals by using the informational data description block to determine a relevance of the data transmission block for the at least one of the plurality of terminals.

28. The method of claim 27, further comprising:

storing the data transmission block in an intermediate memory of the at least one of the plurality of terminals if the data transmission block is determined to be relevant, a stored data transmission block being retrievable by a user of the at least one of the plurality of terminals.

29. The method of claim 26, wherein the data transmission block is simultaneously transmittable by the information transmission station to the plurality of terminals by a distributor network.

30. The method of claim 26, wherein the informational content data and the informational description data are loadable by the central information transmission station by a first transmission network, and the data transmission block is transmittable to the plurality of terminals by a second transmission network.

31. An information transmission system comprising:

at least one information provider station for providing informational content data and informational description data;

a first transmission network to transmit the informational content data and the informational description data;

a central information transmission station including a memory to store the transmitted data and including a calculation device to generate an informational content data block based on the informational content data and to generate an informational data description block based on transmitted informational description data, and to link the informational content data block and the informational data description block to a data transmission block; and a second transmission network for simultaneously transmitting the data transmission block to a plurality of terminals, wherein the plurality of terminals are connected by a third transmission network to the at least one information provider station to transmit decryption programs.

32. The information transmission system of claim 31, wherein the first transmission network includes a fixed network.

33. The information transmission system of claim 31 wherein the first transmission network includes the Internet.

34. The information transmission system of claim 31, wherein the second transmission network includes a cellular radio communications network.

35. The information transmission system of claim 31 wherein the plurality of terminals include mobile radio communication stations.

36. A method for transmitting informational content data to a plurality of terminals, the method comprising:

providing the informational content data and informational description data in a memory of at least one information provider station;

loading the informational content data and the informational description data into a memory of a central information transmission station;

generating an informational content data block based on loaded informational content data and an informational data description block based on loaded informational description data in the central information transmission station;

linking the informational content data block and the informational data description block to a data transmission block; and transmitting the data transmission block from the central information transmission station to the plurality of terminals;

wherein the data transmission block is automatically transmittable by the information transmission station to the plurality of terminals at regular, settable intervals, and wherein the informational data description block includes decryption and description data indicating a manner of encrypting the data transmission block.

37. An information transmission system comprising:

at least one information provider station for providing informational content data and informational description data;

a first transmission network to transmit the informational content data and the informational description data;

a central information transmission station including a memory to store the transmitted data and including a calculation device to generate an informational content data block based on the informational content data and to generate an informational data description block based on transmitted informational description data, and to link the informational content data block and the informational data description block to a data transmission block; and a second transmission network for simultaneously transmitting the data transmission block to a plurality of terminals;

wherein the data transmission block is automatically transmittable by the information transmission station to the plurality of terminals at regular, settable intervals, and wherein the informational data description block includes decryption and description data indicating a manner of encrypting the data transmission block.

*38. The method of claim 1, wherein the informational data records indicate that data of the informational content data block is audio data and the audio data is communicated acoustically to a user.*

* * * * *